No. 736,809. PATENTED AUG. 18, 1903.
F. W. WORRILL.
BALL WINDING MECHANISM.
APPLICATION FILED AUG. 13, 1902.
NO MODEL.
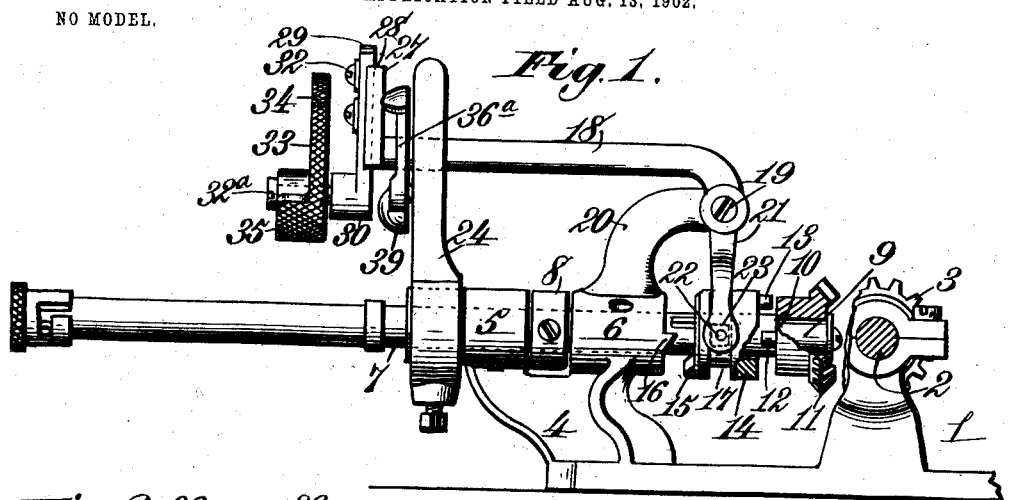
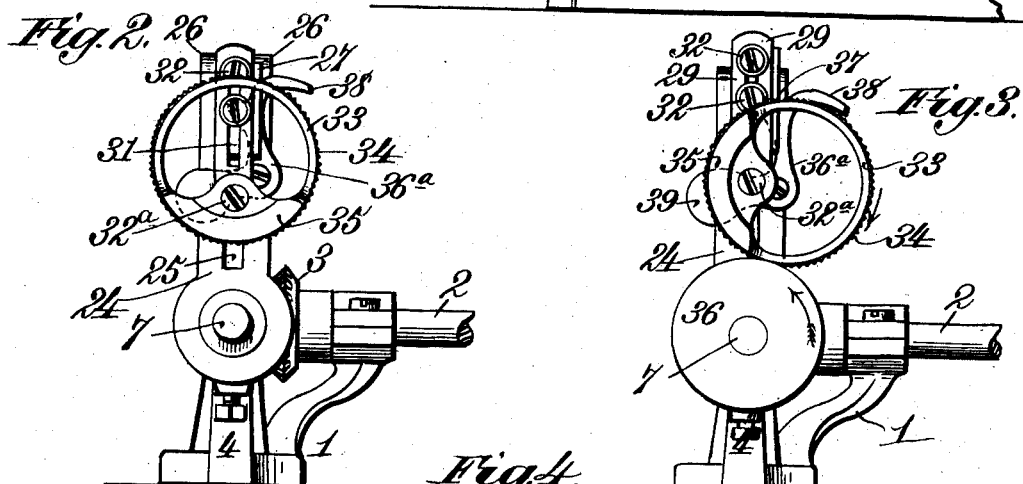
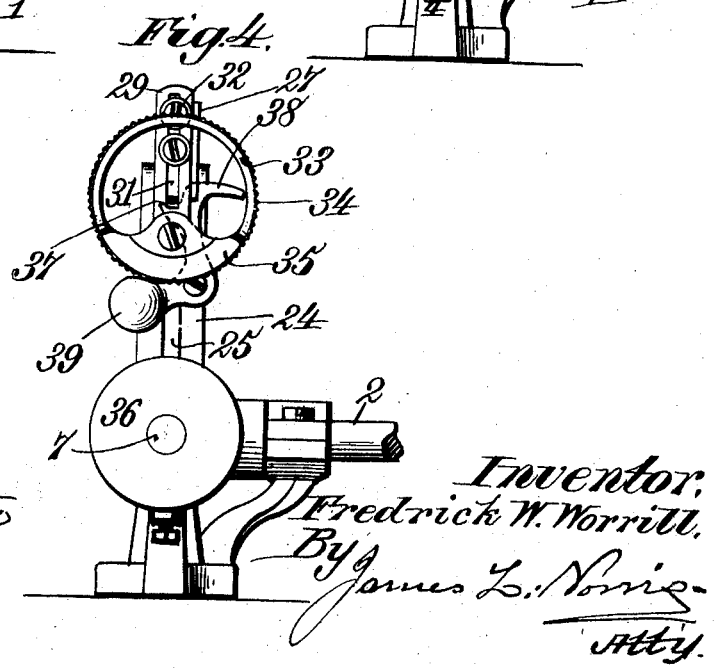
Witnesses.
Robert Everett,
H. B. Keefe
Inventor.
Fredrick W. Worrill.
By James L. Norris
Atty.

No. 736,809. Patented August 18, 1903.

UNITED STATES PATENT OFFICE.

FREDRICK W. WORRILL, OF MACON, GEORGIA.

BALL-WINDING MECHANISM.

SPECIFICATION forming part of Letters Patent No. 736,809, dated August 18, 1903.

Application filed August 13, 1902. Serial No. 119,552. (No model.)

*To all whom it may concern:*

Be it known that I, FREDRICK W. WORRILL, a citizen of the United States, residing at Macon, in the county of Bibb and State of Georgia, have invented new and useful Improvements in Ball-Winding Mechanism, of which the following is a specification.

My invention relates to ball-winding machines, the same residing particularly in a stop-motion therefor.

The object of the invention is to provide novel means for automatically throwing the ball-spindle out of operation when the ball being wound thereon reaches a certain diameter, so as to enable balls of equal weight and diameter to be readily produced.

The invention consists of a rotary ball-spindle, driving means therefor, a clutch for coupling said driving means with said spindle, a lever for operating said clutch, and a weighted eccentric on said lever adapted to be engaged by a ball on said spindle for swinging said lever on its fulcrum and automatically moving said clutch so as to disconnect said spindle from said driving means.

The invention also consists in certain features and details of construction and combinations of parts, which will be hereinafter more fully described and claimed.

In the drawings forming a part of this specification, Figure 1 is an elevation, partly in section, of a ball-winder embodying my improvements, showing the same in operative position. Fig. 2 is an end view of the same. Fig. 3 is a similar view showing the ball in the act of rotating the weighted eccentric and raising the lever by which it is carried; and Fig. 4 is a similar view showing the lever locked in its raised position.

Like reference-numerals indicate like parts in the different views.

The frame of the device has rising therefrom an upright or standard 1, in the upper end of which is mounted a driving-shaft 2, having a bevel-pinion 3 thereon. The said frame also has extending upwardly therefrom a standard 4, which terminates at its upper end in bearing-sleeves 5 6, in which the spindle 7 is mounted for rotation. The bearing-sleeves 5 and 6 are slightly separated from each other, and between them is located a collar 8, the same being screwed or otherwise secured to the spindle 7 and acting in conjunction with the bearing-sleeves 5 and 6 to prevent longitudinal movement of said spindle. The inner end of the spindle 7 is reduced in diameter, as shown at 9, to form a shoulder 10. On the reduced end 9 is loosely mounted a bevel-pinion 11, the hub of which bears against the shoulder 10, so that it is incapable of longitudinal movement, and the teeth of which mesh with those of the pinion 3, heretofore referred to. The hub of the pinion 11 is provided with a longitudinally-extending lug or projection 12, which is adapted to engage a corresponding lug or projection 13 on a clutch 14. The said clutch is in the form of a sleeve surrounding the spindle 7 and having a feather-and-groove connection with said spindle, so that it is capable of longitudinal movement thereon, but is incapable of rotary movement independent of said spindle. The said clutch is further provided with a lug or tooth 15, which is adapted to engage a corresponding lug or tooth 16 on the bearing-sleeve 6. The said clutch is further provided with an annular peripheral groove 17. Coöperating with these parts is a bent lever 18, fulcrumed at 19 upon a bracket 20, extending upwardly from the bearing-sleeve 6 and having the lower arm 21 thereof extending downwardly to one side of the clutch 14 and provided with an inwardly-extending stud or tooth 22. On said stud or tooth is pivoted a block 23, which fits within an annular groove 17 in the periphery of the clutch 14. By this construction it will be seen that as the lever 18 is rocked on its fulcrum it will serve to impart a longitudinal movement to the clutch 14, throwing it into or out of engagement with the pinion 11. Secured to the bearing-sleeve 5 and extending upwardly therefrom is a lever-guide 24, the same having a vertically-extending slot 25 in its upper end within which the upper arm of the lever 18 plays. By the slot 25 two substantially parallel arms 26 are formed on the guide 24, which serve to prevent lateral movement of the lever 18, while permitting the free vertical movement thereof. Formed upon the upper free end of the lever 18 is a vertical extension 27, having a longitudinal groove or guideway 28 therein, in which fits the vertical arm 29 of an adjustable eccentric carrying-bracket 30.

The said arm 29 is provided with an elongated slot 31, through which extend the screws 32, by which said bracket 30 is secured to the extension 27. The slot 31 provides for the vertical adjustment of the bracket 30 on the extension 27, for a purpose which will presently appear. The bracket 30 has extending outwardly therefrom a stud or projection 32ª, on which is mounted for rotation in a substantially vertical plane an eccentric or cam 33. The said cam has been shown as provided with a circular rim having a roughened surface 34 thereon. One portion of said cam 33 is weighted, as shown at 35, so that when the same is in its normal position said weighted portion 35 is lowermost. The weighted portion 35 is formed upon that part of the rim of the eccentric 33 which is nearest to the stud on which the eccentric is mounted. The ball 36 is wound upon the spindle 7 directly beneath the eccentric 33. Pivoted to one of the arms 26 of the lever-guide 24 is a latch 36ª, having a shoulder 37 thereon, adapted to be engaged by the under side of the lever 18 to maintain the latter in its raised position. The said latch is formed with a forwardly-extending finger-piece 38 and with an inwardly-extending weighted arm 39, which tends to normally throw said latch inwardly into coöperative relation with the lever 18.

Constructed as above described it is thought that the operation of my improved device will be readily understood. Briefly stated, however, it is as follows: The shaft 2 being constantly rotated transmits its motion through the pinion 3 to the pinion 11, which is loosely mounted on the spindle 7. When the device is in operation, the free end of the lever 18 is in its lowermost position, and the clutch 14 is thereby moved outwardly, so as to bring the lug 13 thereon within the path of movement of the lug 12 on the hub of the pinion 11. As the pinion 11 rotates, therefore, it transmits its movement through the engagement of the lug 12 thereon with the lug 13 on the clutch 14 to the spindle 7. As the ball 36 being wound upon the spindle 7 increases in diameter the periphery thereof gradually approaches the weighted portion 35 of the eccentric 33. When contact actually takes place between the ball and the weighted portion of said eccentric, the latter is turned upon its pivot 32ª, with the result that the upper free end of the lever 18 is elevated and the arm 21 of said lever is retracted or drawn away from the pinion 11. When said arm 21 is moved in the direction indicated, it carries with it the clutch 14, separating the lug 13 thereon from the lug 12 on the pinion 11, and thereby disconnecting the said clutch from said pinion. The spindle 7 is thereby thrown out of operative relation with the pinion 11 and the lug 15 on the clutch 14 is brought into engagement with the lug 16 on the bearing-sleeve 6, with the result that the turning movement of the spindle 7 is instantly arrested. The lugs 15 and 16 constitute positive stops for arresting the rotary movement of the spindle 7, whereas the separation of the lug 13 on the clutch 14 from the lug 12 on the pinion 11 merely serves to throw the spindle out of operative relation with the driving mechanism. When the lever 18 is raised by the means described, it moves upwardly along one side of the latch 36ª until it passes the shoulder 37 thereon. When it reaches a point above the shoulder 37, the latch 36ª is moved inwardly by the action of the weighted arm 39, throwing the shoulder 37 beneath the lever 18 and preventing the downward movement of the latter. The said lever 18 when raised, therefore, remains in its raised position until the latch 36ª is released from its engagement therewith. This may readily be done by merely applying pressure to the finger-piece 38.

It will be obvious that by adjusting the bracket 30 upwardly or downwardly in the guideway 28 of the extension 27 the device may be adapted for use in winding balls of different sizes — that is to say, when the bracket 30 is adjusted upwardly on the extension 27 the stop-motion will be thrown into operation by the formation of a ball of larger diameter, whereas if the bracket 30 be adjusted downwardly on the extension 27 the stop-motion will be thrown into operation by a ball of smaller diameter. The roughened surface 34 is formed on the eccentric 33 to prevent any slipping between the ball 36 and said eccentric, and thereby insure the operation of the device.

Having now described my invention, what I claim as new, and desire to secure by Letters Patent, is—

1. In a ball-winder, the combination with a rotary spindle, driving mechanism therefor and a clutch for connecting and disconnecting said spindle from said driving mechanism, of a rotary cam or eccentric operatively connected with said clutch and adapted to be engaged by the ball, when the same reaches a certain predetermined size, for throwing said spindle out of operation.

2. In a ball-winder, the combination with a rotary spindle, driving mechanism therefor and a clutch for connecting and disconnecting said spindle from said driving mechanism, of a lever connected with said clutch for operating it, and a rotary cam or eccentric on said lever adapted to be engaged by the ball, when the same reaches a certain predetermined size, for swinging said lever and thereby shifting said clutch to throw said spindle out of operation.

3. In a ball-winder, the combination with a rotary spindle and the driving mechanism therefor, of a lever, means actuated by said lever for connecting and disconnecting said spindle from said driving mechanism, and for positively stopping the rotation of the spindle when the latter is disconnected from the driving mechanism, and a rotary cam or eccentric on said lever adapted to be engaged by the ball, when the same reaches a certain predetermined size, for swinging said lever and disconnecting said spindle from said driving mechanism.

4. In a ball-winder, the combination with a rotary spindle and the driving mechanism therefor, of a lever, means actuated by said lever for connecting and disconnecting said spindle from said driving mechanism, and for positively stopping the rotation of the spindle when the latter is disconnected from the driving mechanism, a rotary cam or eccentric on said lever adapted to be engaged by the ball, when the same reaches a certain predetermined size, for swinging said lever and disconnecting said spindle from said driving mechanism, and means for adjusting said cam or eccentric on said lever, as and for the purpose set forth.

5. In a ball-winder, the combination with a rotary spindle, driving mechanism therefor, and a clutch for connecting and disconnecting said spindle from said driving mechanism, of means automatically thrown into operation by the ball, when the same reaches a certain predetermined size, for shifting said clutch to throw said spindle out of operation, and independent means actuated by the clutch for positively arresting the rotary movement of said spindle.

6. In a ball-winder, the combination with a rotary spindle, a pinion loosely mounted thereon and a driving-shaft having a gear thereon meshing with said pinion, of a clutch having a feather-and-groove connection with said spindle, and adapted to be thrown into and out of operative relation with said pinion, a lever connected with said clutch for operating it, and a rotary cam or eccentric on said lever adapted to be engaged by the ball, when the same reaches a certain predetermined size, for swinging said lever and disconnecting said clutch from said pinion.

7. In a ball-winder, the combination with a rotary spindle, a pinion loosely mounted thereon and a driving-shaft having a gear thereon meshing with said pinion, of a clutch having a feather-and-groove connection with said spindle, and adapted to be thrown into and out of operative relation with said pinion, a lever connected with said clutch for operating it, and a rotary cam or eccentric on said lever adapted to be engaged by the ball, when the same reaches a certain predetermined size, for swinging said lever and disconnecting said clutch from said pinion.

8. In a ball-winder, the combination with a rotary spindle, a pinion loosely mounted thereon and a driving-shaft having a gear thereon meshing with said pinion, of a clutch having a feather-and-groove connection with said spindle, and adapted to be thrown into and out of operative relation with said pinion, a lever connected with said clutch for operating it, a rotary cam or eccentric on said lever adapted to be engaged by the ball, when the same reaches a certain predetermined size, for swinging said lever and disconnecting said clutch from said pinion, and means for adjusting the position of said cam or eccentric on said lever toward and away from said spindle, as and for the purpose set forth.

9. In a ball-winder, the combination with a rotary spindle, a pinion loosely mounted thereon and a driving-shaft having a gear thereon meshing with said pinion, of a clutch having a feather-and-groove connection with said spindle, so that it is capable of longitudinal movement thereon, correlative parts on said clutch and pinion whereby the same may be thrown into and out of engagement with each other, a lever connected with said clutch for operating it, means on said lever adapted to be engaged by the ball, when same reaches a certain predetermined size, for swinging said lever and thereby disconnecting said clutch from said pinion, and means for positively arresting the rotary movement of said spindle.

10. In a ball-winder, the combination with a main frame, a rotary spindle mounted in bearings therein, a pinion loosely mounted on said spindle having a stud or projection thereon, and a driving-shaft having a gear thereon meshing with said pinion, of a clutch having a feather-and-groove connection with said spindle, so that it is capable of longitudinal movement thereon, a stud or projection on said clutch adapted to be engaged by the corresponding part of said pinion when said clutch is at the limit of its movement in one direction, a lever connected with said clutch for operating it, means on said lever adapted to be engaged by the ball, when the same reaches a certain predetermined size, for swinging said lever and shifting said clutch so as to disconnect the latter from said pinion, and a lug on said clutch adapted to engage a fixed part, when said clutch is in its retracted position, for positively arresting the turning movement of said spindle.

11. In a ball-winder, the combination with a rotary spindle, driving mechanism therefor, a lever, and means actuated by said lever for connecting and disconnecting said spindle from said driving mechanism, of a guide for preventing lateral movement of said lever, having a slot therein within which one arm of said lever moves, and a rotary cam or eccentric on said lever adapted to be engaged by the ball, when the same reaches a certain predetermined size, for swinging said lever and disconnecting said spindle from said driving mechanism.

12. In a ball-winder, the combination with a rotary spindle, driving mechanism therefor, a lever, and means actuated by said lever for connecting and disconnecting said spindle from said driving mechanism, of a guide for preventing lateral movement of said lever, having a slot therein within which one arm of said lever moves, a rotary cam or eccentric on said lever adapted to be engaged by the ball, when the same reaches a certain predetermined size, for swinging said lever and disconnecting said spindle from said driving mechanism, and a latch pivoted to said guide and having a shoulder and a weighted arm thereon, the said arm serving to automatically move said latch into operative relation with said lever when the latter is in its retracted position.

13. In a ball-winder, the combination with a rotary spindle, driving mechanism therefor, a lever, and means actuated by said lever for connecting and disconnecting said spindle from said driving mechanism, of an extension on said lever, a bracket adjustably mounted therein, a weighted cam or eccentric mounted to turn in a substantially vertical plane on said bracket, and adapted to be engaged by the ball, when the same reaches a certain predetermined size, for swinging said lever and disconnecting said spindle from said driving mechanism, means for automatically locking said lever in its retracted position, and means for positively arresting the turning movement of said spindle.

In testimony whereof I have hereunto set my hand in presence of two subscribing witnesses.

FREDRICK W. WORRILL.

Witnesses:
W. R. WHITE,
WILLIAM D. ANDERSON.